United States Patent [19]

Kawai et al.

[11] Patent Number: 4,889,969
[45] Date of Patent: Dec. 26, 1989

[54] REDUCED-SPATTER PULSE ARC WELDING MACHINE FOR USE WITH A CONSUMABLE ELECTRODE

[75] Inventors: Naoki Kawai, Ikeda; Kouji Hamamoto; Tomiaki Hosokawa, both of Takarazuka, all of Japan

[73] Assignee: Matsushita Electric Industrial Co., Ltd., Osaka, Japan

[21] Appl. No.: 185,459

[22] Filed: Apr. 25, 1988

[30] Foreign Application Priority Data

Apr. 28, 1987 [JP] Japan .................................. 62-105146
May 21, 1987 [JP] Japan .................................. 62-124205

[51] Int. Cl.⁴ .............................................. B23K 9/09
[52] U.S. Cl. ............................ 219/130.51; 219/130.21
[58] Field of Search ....................... 219/137 PS, 130.51, 219/130.21

[56] References Cited

U.S. PATENT DOCUMENTS 4,697,062 9/1987 Awano et al. .................... 219/130.51

FOREIGN PATENT DOCUMENTS 250875 11/1985 Japan .
115680 6/1986 Japan .
63-48632 of 1988 Japan .
63-48632 of 1988 Japan .

Primary Examiner—Clifford C. Shaw
Attorney, Agent, or Firm—Spencer & Frank

[57] ABSTRACT

A consumable electrode arc welding machine in which if a short circuit does not lasts beyond a predetermined first time limit, pulse current and base current outputs for the arc are alternated with each other in a basic pulse period. If a short circuit lasts beyond the first time limit, the welding output during the subsequent short circuit period is subjected to constant-current control along a predetermined first trace, and a second time limit begins from the start of arc regeneration. The welding output is controlled to be different from both the pulse current and base current during the second time limit to restore the operation of the welding within the basic pulse period.

8 Claims, 9 Drawing Sheets

FIG. 2
(a)
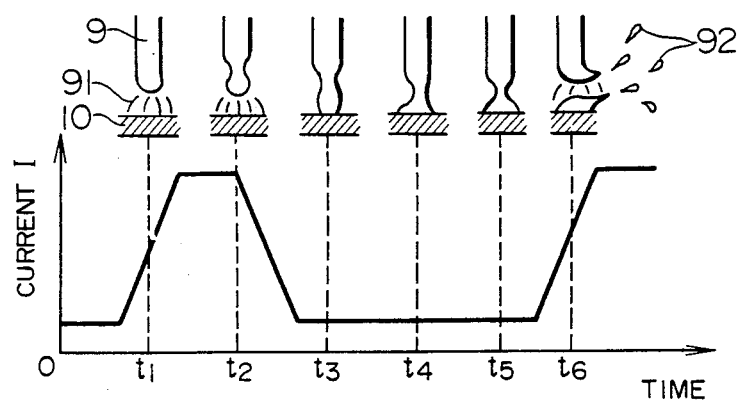
(b)
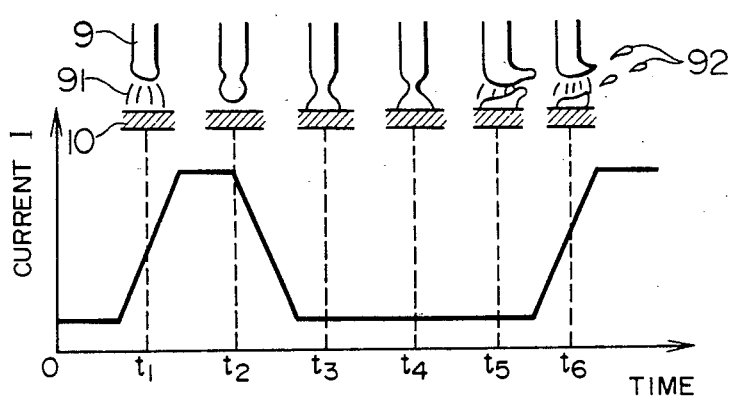

FIG. 6

| INPUT/OUTPUT CLASSIFICATION | TERMINALS IN RIGHT DRAWING | OPERATIONAL TRUTH VALUE TABLE |||||||
|---|---|---|---|---|---|---|---|
| | | INPUT |||| OUTPUT ||
| | | CLR | $\overline{PR}$ | D | CK | Q | $\overline{Q}$ |
| | | L | H | X | X | L | H |
| | | H | L | X | X | H | L |
| | | L | L | X | X | H | H |
| | | H | H | L | L→H | L | H |
| | | H | H | H | L→H | H | L |
| | | H | H | X | H→L | Qn | $\overline{Qn}$ |

X = NOT RELATED TO H OR L

Qn = Q OUTPUT IN PREVIOUS START HELD $\overline{Qn}$ = $\overline{Q}$ OUTPUT IN PREVIOUS START HELD

CK = OUTPUT REMAINS UNCHANGED AT H OR L LEADING EDGE SYSTEM tS2, tS3 ···· SHORTING

REDUCED-SPATTER PULSE ARC WELDING MACHINE FOR USE WITH A CONSUMABLE ELECTRODE

BACKGROUND OF THE INVENTION

1. Field of the invention

The present invention relates to a consumable electrode arc welding machine in which a consumable electrode in the form of a welding wire is automatically fed to a base member which is to be welded and wire droplets are transferred to the base member with a reduced amount of spatter at the time of the welding operation.

2. Description of the prior art

The conventional pulse MIG welding process, in which molten metal from a wire is positively reduced to a spray state for transfer to the base metal by being supplied with a pulse current, has various characteristics different from what is called the ordinary MIG welding process using a constant DC current. One of the great differences between the characteristics of these two welding processes is that when the welding output current is low, the welding operation is performed by repeated short circuits and arcs in the ordinary MIG welding process using DC, while the molten metal from the wire can be transferred to the base metal in the form of spray in the pulse MIG welding process. Transfer in spray form has a distinct feature, as compared with ordinary welding by what might be called shorting transfer, in the generation of spatter. Namely, the welding by spray transfer causes much less spatter than ordinary welding by shorting transfer. This is one of the great advantages of the pulse MIG welding process. In the pulse MIG welding process, however, if the arc voltage is set to a low level and the arc length is reduced, a short circuit is liable to occur between the electrode wire and the base metal. An excessively low voltage setting causes an increased number of shorts, often undesirably leading to as much spatter as the ordinary MIG welding process.

FIG. 1 is a graph showing the amount of spatter plotted against the arc voltage as measured with a conventional pulse MIG welding machine. As shown in FIG. 1, the spatter that is generated sharply increases with a decrease in the arc voltage. The reason for this increase is that the pulse current is supplied during periods set within the welding machine regardless of whether the wire is in contact with the base metal (i.e., the shorted condition) or whether an arc is generated out of contact therewith. That is, the pulse current is supplied regardless of the condition of the weld zone in this respect. This point will be explained in more detail below.

In the conventional pulse MIG welding machine, as described above, a pulse current is supplied during periods set within the welding machine regardless of the conditions of the weld zone. Therefore more spatters are generated by shorting transfer when the arc voltage is set to a low level, that is, when the forward end of the welding wire is in contact with the base metal, thereby increasing the chance that the molten globule at the forward end of the wire will be transferred to the base metal by the pinch effect due to the current or the surface tension of the molten metal. However, when the forward end of the welding wire is out of contact with the base metal, all the molten metal globules at the forward end of the wire are transferred to the base metal in spray form in what is called a spray transfer.

The arc voltage may be set to a low level in order to prevent undercutting with an increased welding rate, such undercutting being a welding defect. With the decrease in the welding voltage, however, a great amount of spatter is generated, thereby adversely affecting the advantage of the otherwise small-spatter pulse MIG welding method. The promotion of spatter when the pulse current is applied without regard to the conditions of the weld zone will be explained with reference to FIG. 2.

FIGS. 2a and 2b show changes in the welding current waveform with time against the droplet transfer at the weld zone with time in a conventional pulse MIG welding machine with an arc voltage set to such a low level that shorts occasionally occur. In FIG. 2, reference numeral 9 designates a welding wire, numeral 10 designates a base metal, numeral 91 designates a welding arc, and numeral 92 designates spatter. FIG. 2a represents the case in which the second pulse current is supplied when the welding wire 9 is shortcircuited with the base metal. In this case, the molten metal is released from the short with the dispersion of the spatter 92 at time point $t_6$ under a strong pinch effect of the pulse current. On the other hand in the case of FIG. 2b where the short is eliminated at time point $t_5$ immediately before the second application of a current pulse, the second current pulse is applied before the molten drop at the forward end of the welding wire and the molten metal that has been transferred are joined into needle form, and therefore the pulse current causes spatters 92 at time point $t_6$.

The foregoing is the description of the prior art relating to the pulse MIG welding process and the reason why spatter increases when the arc voltage is set to a low level in conventional pulse MIG welding machines.

SUMMARY OF THE INVENTION

The object of the present invention is to obviate the problems of conventional pulse MIG welding machines, and to provide an arc welding machine accompanied by less spatter even under a low arc voltage setting with an increased welding rate involving occasional shorting transfers.

According to the present invention, there is provided an arc welding machine characterized in that if a short circuit or contact shorting lasts not more than a predetermined first time limit, the pulse current output is alternated with the base current in a basic pulse period, and if the short circuit lasts beyond the first time limit, the welding output pulse current during the subsequent shorting process is subjected to a constant-current control along a predetermined first trace with a speed not higher than the rise of the pulse current. Further, if an arc is regenerated after the short circuit beyond the first time limit, a second time limit starts to be counted from the starting point of the regenerated arc, and a third welding output control different from the pulse current of base current is effected within the second time limit, after which normal operation within the basic pulse period is restored. For this purpose, the arc welding machine according to the present invention comprises an arc/short decision circuit for deciding whether a consumable electrode in the form of a welding wire is in contact with a base metal for welding so as to produce a short or whether the wire is out of contact with the base metal so as to generate an arc and for producing an arc-short decision signal, a dip pulse control circuit supplied with the arc-short decision signal as one input thereto for designating a pulse arc welding waveform to produce the pulse current and the base current by time division within the third time limit making up the basic pulse period for spray transfer of the welding wire in the case where the short circuit occurs within the predetermined first time limit and designating a shorting transfer welding waveform to effect a shorting transfer of the welding wire from the end of the first time limit in the case where the short circuit lasts beyond the first time limit, the dip pulse control circuit producing, after the arc is regenerated upon termination of the short, a waveform switching signal continuing to designate the shorting transfer welding waveform until the lapse of the second time and a pulse sync signal designating the starting time of application of a current pulse for pulse arc welding, a pulse waveform circuit supplied with the pulse sync signal as one input thereto for producing a pulse control signal time-divided by the pulse current and the base current within the third time limit, a dip waveform circuit supplied with the arc-short decision signal as one input thereto for producing a dip control signal designating a constant-current welding output along a predetermined first trace not higher in speed than the rise of the pulse current during the short circuit and designating a third welding output control different both from the base current and the pulse current during arc generation after arc reproduction, and switching means supplied with the waveform switching signal for applying the pulse control signal or the dip control signal selectively to a drive circuit for driving the welding output control means.

BRIEF DESCRIPTION OF THE DRAWINGS

FIG. 2 is a diagram showing chronological changes in the welding current waveform and the condition of molten droplets in a conventional pulse MIG welding machine.

FIG. 6 is a diagram showing an operational truth value of the flip-flop IC shown in FIG. 5.

DESCRIPTION OF THE PREFERRED EMBODIMENTS

Figure 1:
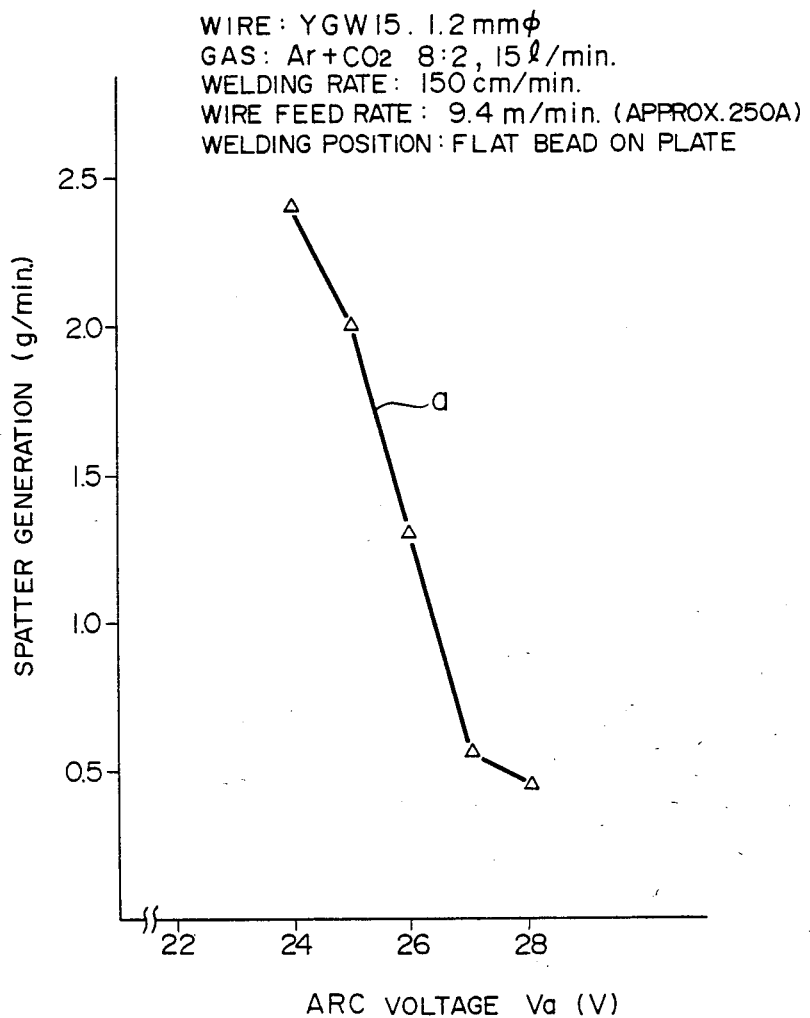
FIG. 1 is a diagram showing the amount of spatter generated, as a function of the arc voltage, in conventional pulse MIG welding machines.
Figure 3:
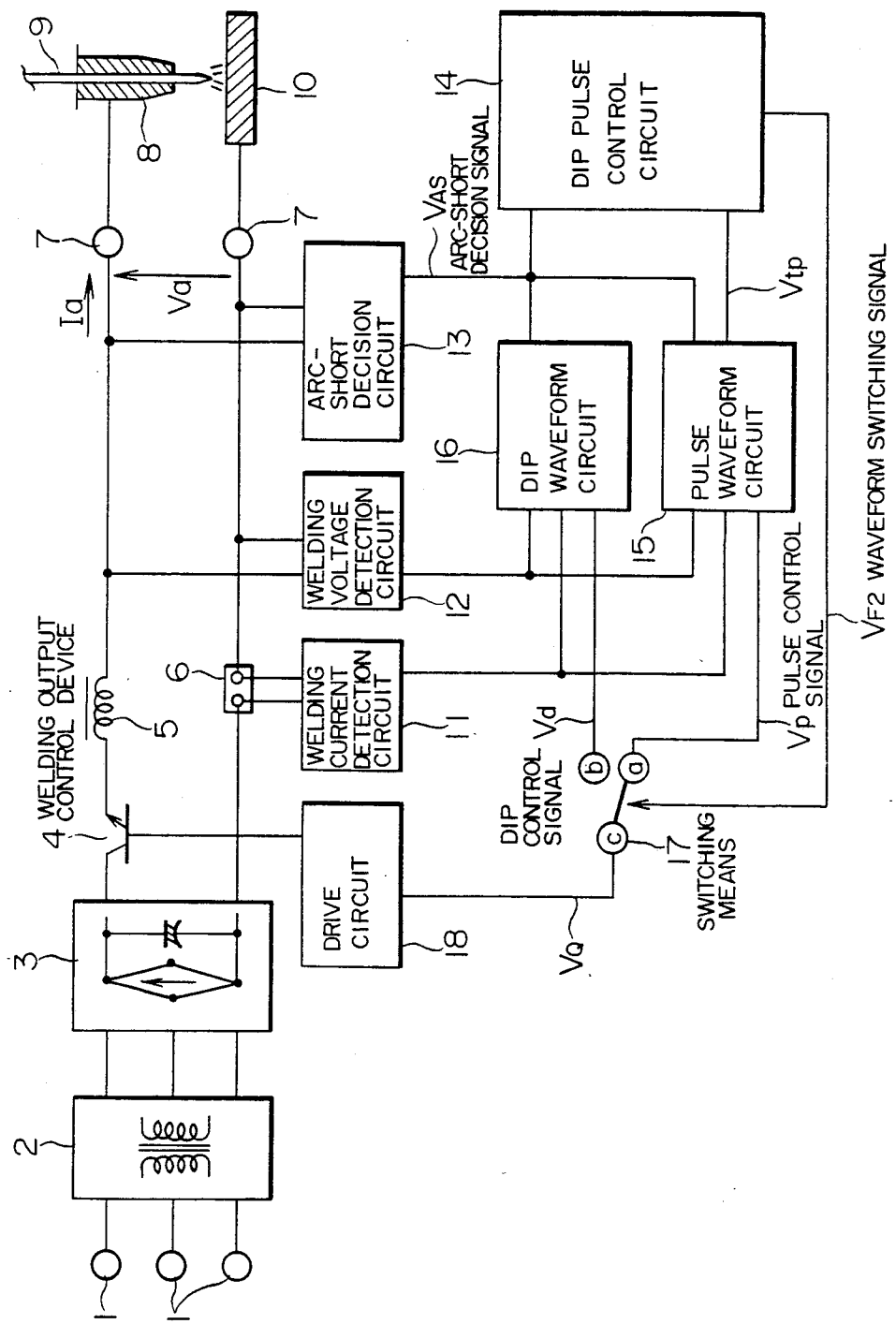
FIG. 3 shows a block diagram of an arc welding machine configured according to the present invention.

In the arc welding machine shown in FIG. 3, reference numeral 1 designates input terminals for introducing power to a transformer 2, numeral 3 designates a rectification-smoothing circuit, numeral 4 designates a welding output control means, numeral 5 designates a reactor, numeral 6 designates a current-divider, numeral 7 designates output terminal, numeral 8 designates an energizing contact sleeve, numeral 9 designates a welding wire, numeral 10 designates a base metal or workpiece, numeral 11 designates a welding current detection circuit, and numeral 12 a welding voltage detection circuit.

Numeral 13 designates an arc-short decision circuit for producing an arc-short decision signal $V_{AS}$. Numeral 14 designates a dip pulse control circuit for producing a pulse sync signal $V_{tp}$ and a waveform switching signal $V_{F2}$.

Numeral 15 designates a pulse waveform circuit for producing a pulse control signal $V_p$. Numeral 16 designates a dip waveform circuit for producing a dip control signal $V_d$. Numeral 17 designates a switching means for selecting and producing the pulse control signal $V_p$ or the dip control signal $V_d$ as a drive signal $V_Q$ depending on the "high" or "low" state of the waveform switching signal. Numeral 18 designates a drive circuit for driving the welding output control means 4 in response to the drive signal $V_Q$. In FIG. 3, reference character $I_a$ designates the welding current and the character $V_a$ identifies the welding voltage.

Figure 4:
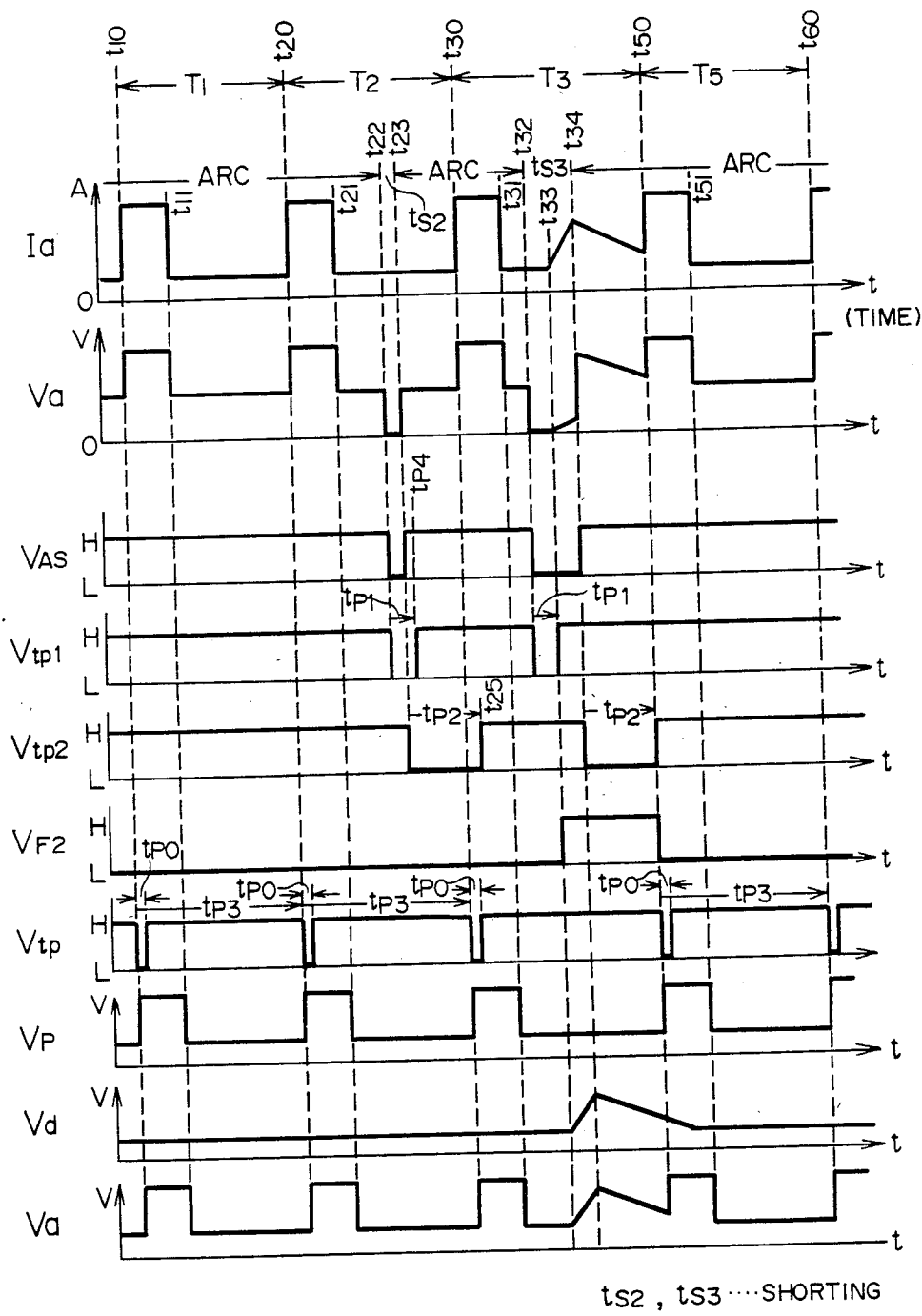
FIG. 4 is a time chart of signals produced by the essential parts of the invention included in FIG. 3.

FIG. 4 is a time chart showing chronological changes in the signals and the welding current and voltage as shown in FIG. 3.

The period $T_1$ in FIG. 4 is one during which a short circuit does not occur within a third time limit $t_{p3}$ (the source of the time limit $t_{p3}$, which establishes the basic pulse period, will be described later), and the decision circuit 13 continues to produce a "high" arc-short decision signal $V_{AS}$ indicating that an arc is being generated. As a result, the dip pulse control circuit 1 keeps the waveform switching signal $V_{F2}$ a "low" level, indicating the pulse welding mode. The dip pulse control circuit 14 also produces the pulse sync signal $V_{tp}$ designating the start of the current pulses. The pulse waveform circuit 15 determines a pulse current value, a base current value, and the time ratio between the pulse current value and the base current value within the third time limit $t_{p3}$ in response to the rise of the pulse sync signal $V_{tp}$ thereby to produce the pulse control signal $V_p$. The switching means 17 selects the pulse control signal $V_p$ as a drive signal $V_Q$ and applies it to the drive circuit 18 in view of the fact that the waveform switching signal $V_{F2}$ designates the pulse welding mode. As a result, the welding output control means 4 controls the welding current $I_a$ in such a manner as to follow the trace of the pulse control signal $V_p$.

The time $T_2$ in FIG. 4 is a period during which a minor short circuit occurs at a time point $t_{22}$ in the base current period. This short is terminated naturally, due to vibration at the weld zone of the like at a time point $t_{23}$ before completion of a first time limit $t_{p1}$. The arc is regenerated when the short terminates. Since the short circuit period $t_{S2}$ is less than the first time limit $t_{p1}$, the dip pulse control circuit 14 keeps the waveform switching signal $V_{F2}$ at the "low" level designating the pulse welding mode. Additionally, the pulse sync signal $V_{tp}$ repeats when the third time limit $t_{p3}$ making up the basic pulse period expires and shifts to the next period $T_3$. As a result, the operation during period $T_2$ is similar to those for the period $T_1$.

During the period $T_3$ shown in FIG. 4, on the other hand, a short circuit occurs at time point $t_{32}$ and is not terminated even at a time point $t_{33}$ upon the elapse of the first time limit and $t_{p1}$, and instead lasts until the time point $t_{34}$. The short contact shorting is terminated to generate an arc by application thereto of a short circuit current along a first trace, and is followed by a second time limit $t_{p2}$ lacking a short. In this case, the dip pulse control circuit 14 functions to suspend the counting of the third time limit $t_{p3}$ at the time point $t_{33}$ upon lapse of the first time limit $t_{p1}$, while at the same time switching the waveform switching signal $V_{F2}$ from the "low" to the "high" level. The "high" level of the signal $V_{F2}$ designates shift from the pulse welding mode to a shorting transfer welding (dip welding) mode. The switching means 17 thus selects the dip control signal $V_d$ and applies it to the drive circuit 18, and the welding output control means 4 controls the welding output current $I_a$ along the first trace in response to the dip waveform circuit 16. After arc regeneration, a third welding output control prevails during the second time limit $t_{p2}$, with the result being that the welding current $I_a$ during the period form time $t_{33}$ to $t_{50}$ is different from the pulse current or the base current. At the time point $t_{50}$, when the second time limit $t_{p2}$ has elapsed, the dip pulse control circuit 14 keeps the pulse sync signal $V_{tp}$ at a "low" level for predetermined time limit $t_{p0}$ and then begins measuring a third time limit $t_{p3}$ again. At the same time the waveform switching signal $V_{F2}$ switches from the "high" to "low" level, thereby designating the a change from the dip welding mode to the pulse welding mode.

As a consequence of this operation, a molten globule to provide the next droplet is formed at the forward end of the wire by the third welding output control during the second time limit $t_{p2}$ after termination of the short circuit, and this droplet is released as spray by the wire by the next current pulse following the time point $t_{50}$. A smooth pulse arc welding operation continues with a drop for each pulse.

The third welding output control described above according to the present invention refers to a control in which the $V_d$ signal decreases with time during the period $t_{p2}$ in FIG. 4. The result is, however, not necessarily that the actual welding output is subjected to a constant-current control; the output depends on the impedance of the welding arc. Actually, therefore, a substantially constant-voltage characteristic is obtained. This control method generally finds applications in conventional arc welding machines of the shorting transfer type, and circuit examples for realizing such a control method need not be described.

In other words, the third welding output control as referred to in the present invention is intended to be defined as a control output different from both the pulse current and base current. An explanation has been made above about FIGS. 3 and 4.

Figure 5:
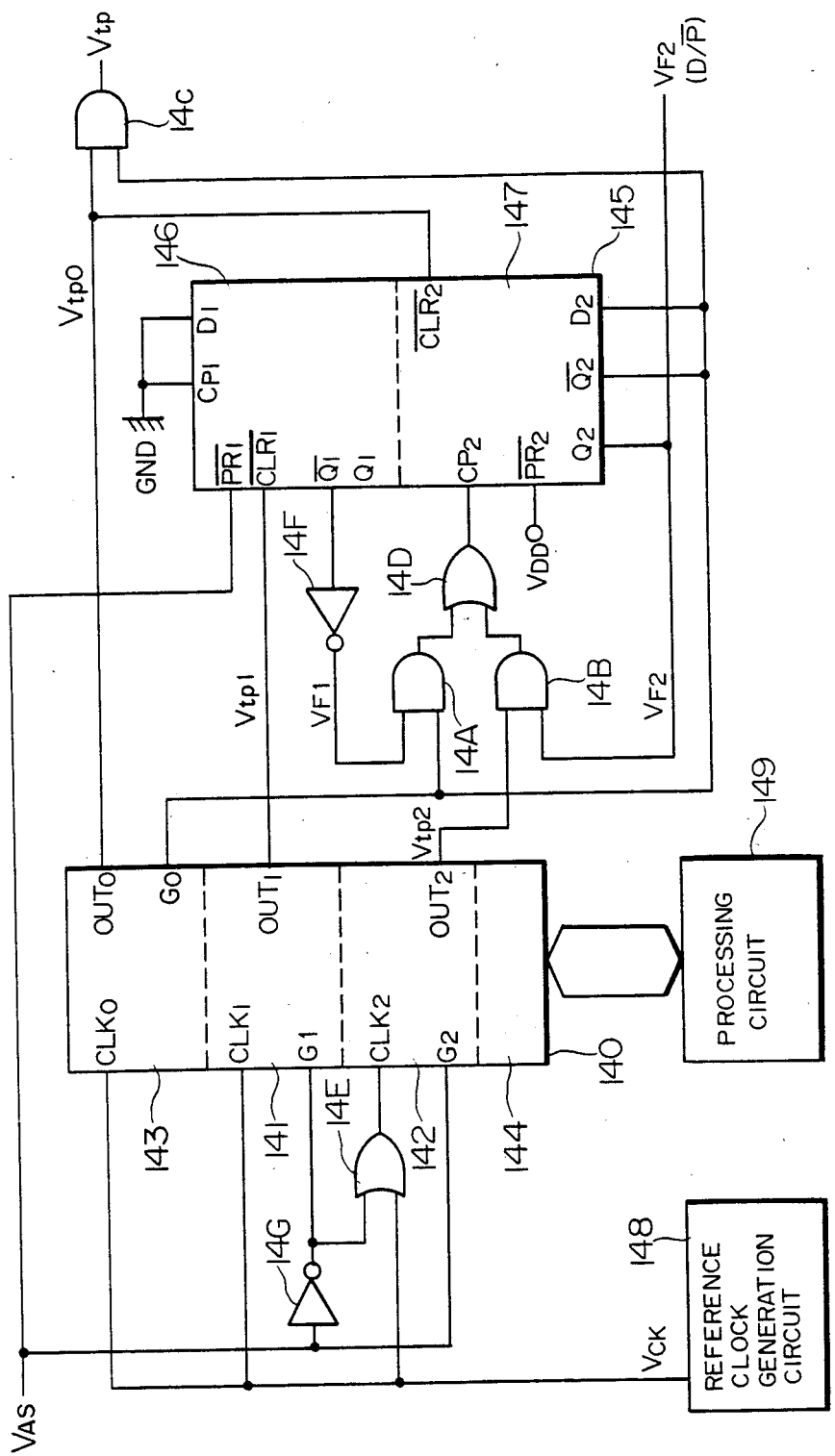
FIG. 5 is a diagram specifically showing a dip pulse control circuit of an arc welding machine according to the present invention.

Now, a specific configuration of the dip pulse control circuit 14 in FIG. 3 is shown in FIG. 5. In FIG. 5, numeral 140 designates a programmable interval timer IC, such as a general-purpose 8253 IC, which includes a first timer circuit 141, a second timer circuit 142, and a third timer circuit 143 independent of each other. Operational mode and the count of the timer circuits are set by control means 144. Numeral 145 designates an IC, such as a general-purpose 7474 IC, having two D-type flip-flop circuits with clear and preset functions. The IC 145 includes a first flip-flop circuit 146 and a second flip-flop circuit 147 independent of each other. Numeral 148 designates a reference clock signal generation circuit for producing a reference clock signal of "high" and "low" levels at predetermined time intervals. Numeral 149 designates a processing circuit for controlling the operational mode and the count of each of the timers of the programmable interval timer IC 140 in accordance with the condition of the welding work. Numerals 14A, 14B, and 14C designate AND gates, numerals 14D and 14E designate or gates, and numerals 14F and 14G designate logic inverters.

The timers in the circuit of FIG. 5 are controlled by the processing circuit 149 and the control means 144 in such a manner that when the input terminal $G_1$ shifts from "low" to "high" level, the first timer circuit 141 begins to count the first time limit $t_{p1}$ by the number of transitions from "high" to "low" level of the signal supplied from the terminal $CLK_1$. Accordingly, the first timer circuit 141 operates as a restartable one-shot timer, producing a "low" signal $V_{tp1}$ while counting the first time limit $t_{p1}$ and a "high" signal $V_{tp1}$ during the remaining time from the terminal $OUT_1$. The second timer circuit 142, like the first timer circuit 141, performs a one-shot timer function. The second timer circuit used in this circuit, however, does not stop counting even when the $G_2$ input is reduced to "low" level during counting, and therefore the OR gate 14E is used to keep the $CLK_2$ input signal at "high" level so as not to proceed with the counting, thereby keeping the $OUT_2$ output at "low" level during the short circuit period. This circuit has thus the function of interrupting the counting and is adapted to restart the counting upon generation of the next arc. When the $G_0$ input is "high," the third timer circuit 143 counts the number of times the signal received by the $CLK_0$ input switches from "high" to "low" level. When this number reaches a predetermined value, the $OUT_0$ output drops to "low" level for a predetermined length of time $t_{po}$, and it is kept at "high" level during the remaining period as a frequency-dividing operation. When the $G_0$ input is reduced to "low" level, the frequency-dividing operation is interrupt with the $OUT_0$ output kept at "high" level, and with the restoration of the next $G_0$ input to "high" level, a new frequency-dividing operation is performed.

The first flip-flop circuit 146 and the second flip-flop circuit 147 in the flip-flop IC 147 operate in accordance with the diagram of FIG. 6, which shows truth values. The first flip-flop 146, in particular, in which the $C_{p1}$ input and the $D_1$ input are kept at "low" level, acts as a set priority R-S flip-flop with the $CLR_1$ input serving as a set input and the $PR_1$ input serving as reset input. Also, the second flip-flop circuit 147 functions as an R-S flip-flop of the edge trigger type, with the signal $V_{F1}$ providing a set input and the signal $V_{tp2}$ providing a reset input by connecting AND gates 14A, 14B and or gate 14D in the manner shown. Signals produced at various parts of the circuit of FIG. 5 take the form shown in FIG. 7 with the same condition changes as in FIG. 4, and thus produce effects similar to those in FIG. 4.

Figure 7:
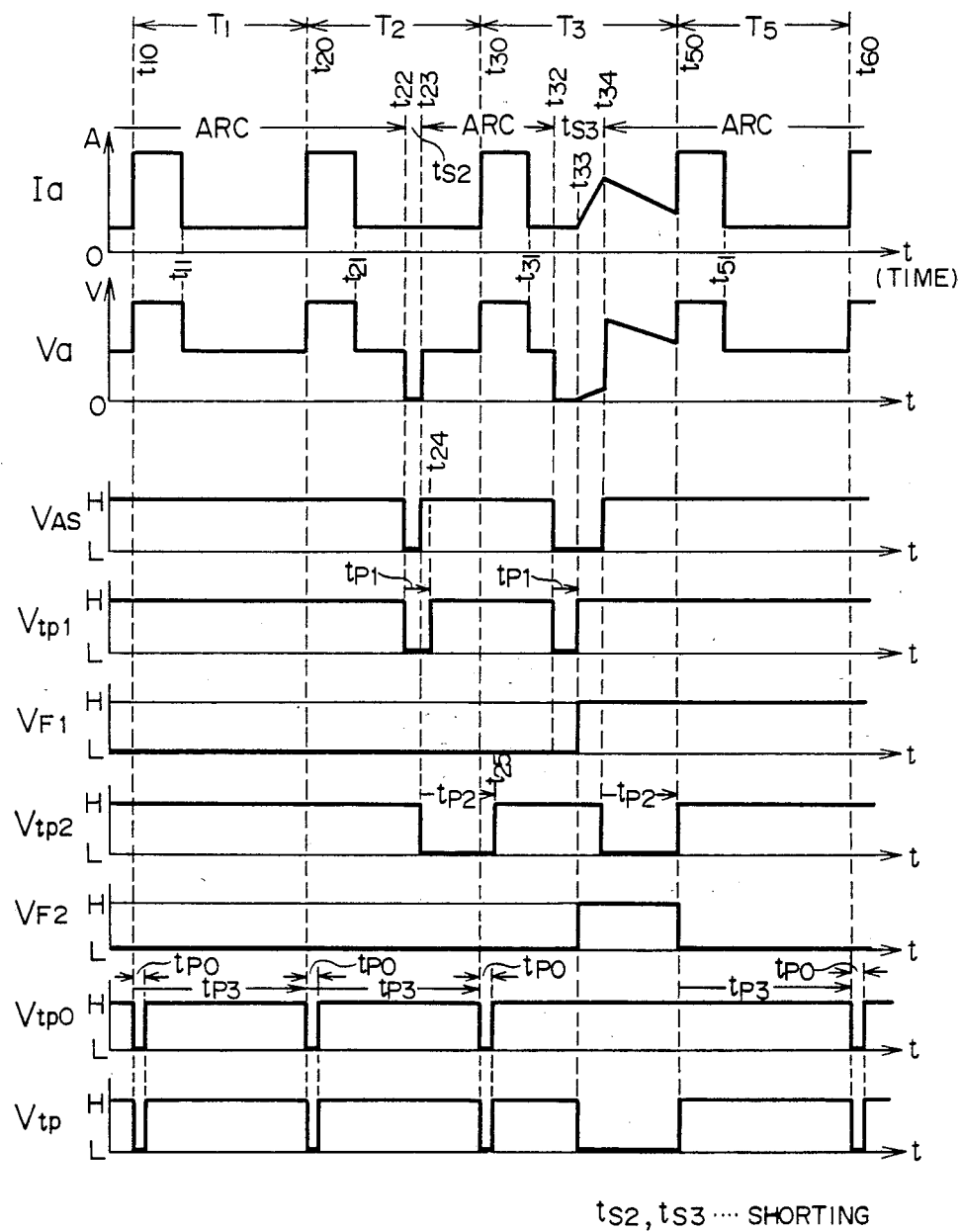
FIG. 7 is a time chart for signals produced by the essential parts included in FIG. 5.

Although the waveform $V_{tp}$ in FIG. 7 is different from the waveform $V_{tp}$ in FIG. 4, the circuit of FIG. 5 functions substantially equivalent to what is shown in FIG. 4 in that a one-shot pulse generation circuit utilizing the leading edge of the waveform $V_{tp}$ may be inserted in FIG. 5 and the output signal of the one-shot pulse generation circuit thus inserted may be used as a signal $V_{tp}$ in FIGS. 3 and 4, and in that the time limit $t_{po}$ in FIG. 7 may be a very small value that can be ignored on the drawing. The reference clock generation circuit 148 in FIG. 5, which is easily realizable by use of a CR oscillation circuit or a crystal transducer, need not be described. Further, the processing circuit 149 includes a microcomputer configured for general purposes to set the operational mode or count of each of the first timer circuit 141, the second timer circuit 142 and the third timer circuit 143 of the programmable interval timer IC 140. Examples of configurations and program for this processing circuit need not be explained.

The arc-short decision circuit 13 detects the welding voltage value $V_a$ in FIG. 3 and, if this value is higher than a predetermined level, generates a "high" level signal indicating an arc. If $V_a$ is lower than the predetermined value, decision circuit 13 generates a "low" level signal indicating a short. This circuit 13 is easily realizing by using a comparator. This process, which is generally used for conventional arc welding machines, need not be described in detail. Also, in place of detecting the welding voltage $V_a$, the arc light may be directly detected.

The dip waveform circuit 16 and the pulse waveform circuit 15, which are also generally configured and operate similarly to corresponding circuits for conventional shorting transfer welding machines and pulse arc welding machines, need not be explained further.

The switching means 17 in FIG. 3 is also easily realizable by a commercially available analog switch IC or the like.

The circuit in FIG. 3 may be configured as a primary inverter control system instead of as a secondary chopper system as shown without departing from the spirit of the invention. Further, the microcomputer used in the processing circuit 149 of the dip pulse control circuit 14 may be replaced by another means to set a count with the same effect, or the timers in FIG. 5 which count the number of reference clock pulses may be of a different type, for example including a capacitor and a resistor.

Figure 8:
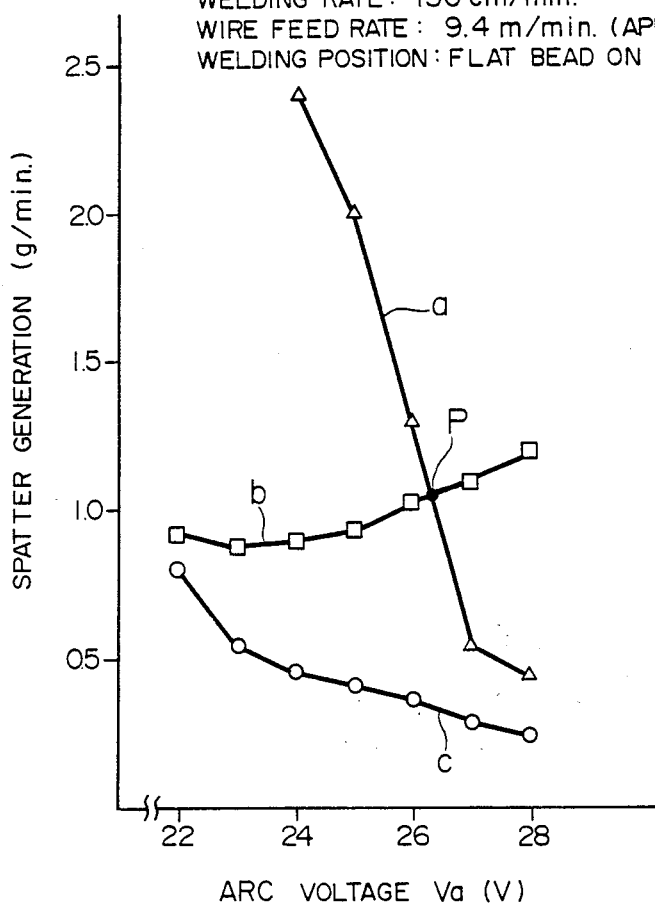
FIG. 8 is a diagram showing data on spatter generated by an arc welding machine according to the invention and data on spatter for conventional arc welding machines.

FIG. 8 illustrates the result of spatter measurements under different arc voltage values $V_a$ when the circuit of FIG. 5 was employed in the arrangement shown in FIG. 3, as compared with the spatter generated by a conventional pulse MIG welding machine and the spatter generated by a conventional shorting transfer (MIG) welding machine.

Figure 9:
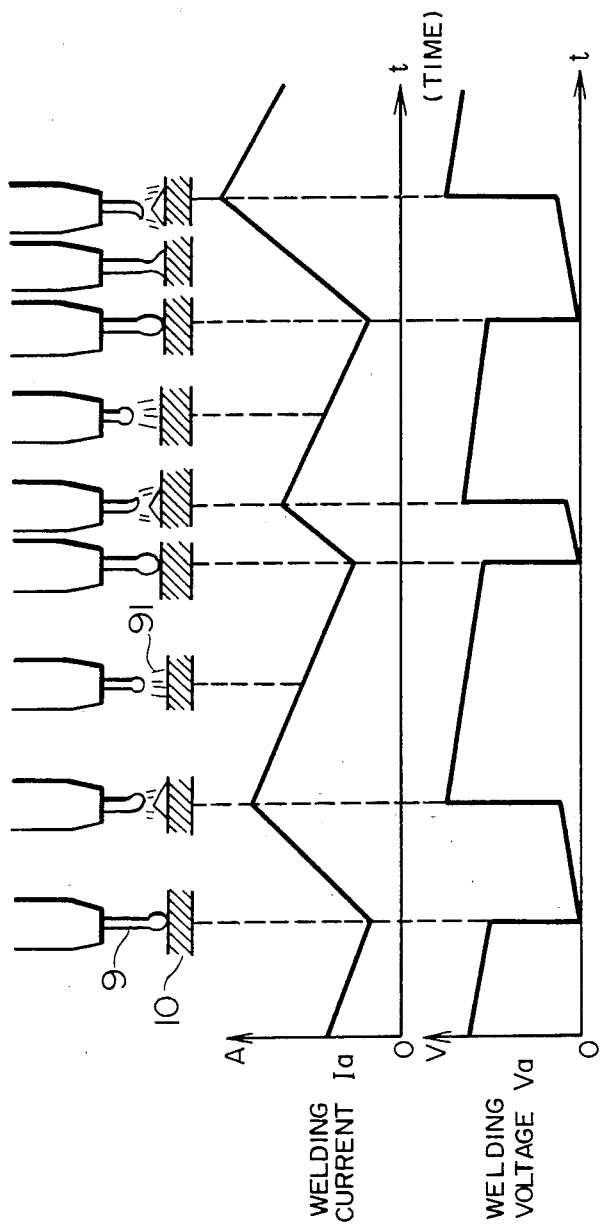
FIG. 9 is a diagram showing chronological changes in welding output waveform and droplet transfer in conventional shorting transfer welding machines.

In FIG. 8, graph a designates the result of measurements with a conventional pulse MIG welding machine. Graph b represents the result of measurements obtained from a conventional shorting transfer (MIG) welding machine performing the welding process with a welding output waveform as shown in FIG. 9.

As seen from a and b in FIG. 8, the pulse MIG welding machine, of the non-contact droplet transfer type, produces less spatter in the region of high arc voltage values $V_a$. However, when the arc voltage value decreases due to an increase in the welding speed or the like, the difference between a and b is reduced to such an extent that for an arc voltage lower than point P, the amount of spatter generated is inverted between the two types of welding machines, so that the MIG welding machine produces less spatter than the pulse MIG welding machine, whose spatter generation increases sharply. This is due to the fact that, as explained with reference to FIG. 2, the probability of shorting is increased and the spatter amount when a short circuit is terminated with a strong current pulse is also increased.

Graph c in FIG. 8 shows the result of measurements for an arc welding machine according to the present invention. In the region of high arc voltage values $V_a$ where shorting is less liable to occur, the spatter is only slightly less than in conventional pulse arc welding machines. During a high speed welding process in which the arc voltage value $V_a$ is reduced to prevent welding defects such as undercutting, however, the probability of short circuits is increased, and the spatter represented by graph c is much below that of conventional MIG welding machines. This is due to the fact that according to the present invention, proper control means for the welding output is selected in accordance with the conditions of the weld zone, taking into consideration the condition of spray transfer without a short or the condition of shorting transfer, under contact shorting, and at the same time a molten globule is formed at the forward end of the wire for the next droplet transfer after termination of a short circuit.

It will thus be understood from the foregoing description that according to the present invention there is provided a pulse MIG welding machine which generates less spatter even when the arc voltage is set to a low level during high-speed welding and occasional shorts occur.

We claim:

1. A pulse arc welding machine for use with a consumable electrode to weld a base metal, comprising:

judging means for judging whether the electrode is shorted with the base metal or whether the electrode is separated from the base metal to generate an arc therebetween, and for producing an arc-short decision signal;

dip-pulse control means responsive to the arc-short decision signal for generating a pulse synchronizing signal and for generating a waveform switching signal having first and second digital states, the waveform switching signal changing from the first digital state to the second digital state if short circuit between the electrode and the base metal has lasted longer than a predetermined first period of time, the waveform switching signal remaining in the second digital state until an arc is restored and for a predetermined second period of time thereafter;

pulse waveform means responsive to the pulse synchronizing signal for generating a pulse control signal which is used for operating the welding machine in a pulse arc welding mode in which the welding current has a sequence of base-pulse periods and a current pulse and a base current alternate in each base-pulse period, with the pulse control signal determining the timings of the current pulse and the base current in each base-pulse period, the welding being accomplished by a spray of material from the electrode in the pulse arc welding mode;

dip waveform means responsive to the arc-short decision signal for generating a dip control signal when the arc-short decision signal indicates that the electrode is shorted to the base metal, the dip control signal being used for operating the welding machine in a shorting transfer mode in which the welding current is controlled to follow a first waveform in which the welding current rises at a rate not greater than the rising rate of the current pulse until an arc is reproduced between the electrode and the base metal, and to thereafter follow a second waveform during the second period of time, the second waveform being different from both the current pulse and the base current;

welding output control means for controlling the welding current; and switching means for conveying the pulse control signal to the welding output control means when the waveform switching signal is in the first digital state and for conveying the dip control signal to the welding output control means when the waveform switching signal is in the second digital state.

2. The pulse arc welding machine of claim 1, wherein the consumable electrode is a wire electrode.

3. The pulse arc welding machine of claim 1, wherein the dip pulse control means comprises first, second, and third timers.

4. The pulse arc welding machine of claim 1, wherein the dip pulse control means comprises means for generating a reference clock signal, a first IC which receives the reference clock signal and the arc-short decision signal, the first IC having three timers, and a second IC connected to the first IC, the second IC having at least one flip-flop.

5. The pulse arc welding machine of claim 1, wherein the dip pulse control means comprises:

means for generating a reference clock signal having levels which change periodically;

first timer means, responsive to the reference clock signal and the arc-short decision signal, for measuring the first time period by counting the reference clock signal to provide a first period signal, the first period signal having a low digital state while the first time period is being counted and having a high digital state after the first time period has expired;

second timer means, responsive to the reference clock signal and the arc-short decision signal, for measuring the second time period by counting the reference clock signal to provide a second period signal, the second period signal having a low digital state while the second time period is being counted and having a high digital state after the second time period has expired, the second timer means being redrivable while the second time period is being counted;

first flip-flop means, responsive to the first period signal and the arc-short decision signal, for generating a first flip-flop signal having a low digital value when an arc between the electrode and the base metal is replaced by a short circuit and having a high digital state if the short circuit remains after expiration of the first time period;

second flip-flop means, responsive to the first flip-flop signal and the second period signal, for generating the waveform switching signal; and third timer means, responsive to the waveform switching signal and the reference clock signal, for measuring a base-pulse period by counting the reference clock signal when the waveform switching signal is in its first digital state, thereby providing a pulse synchronizing signal having a low digital state during a predetermined early portion of the respective base-pulse period and having a high digital state during the remaining portion of the respective base-pulse period, and for holding the pulse synchronizing signal in the low digital state when the waveform switching signal is in its second digital state.

6. A pulse arc welding machine for use with a consumable electrode to weld a base metal, comprising:

first means for supplying a welding current to the electrode and the base metal, the first means having a control signal input port;

second means for sensing the voltage between the electrode and base metal to generate an arc-short decision signal having a first digital value when a short circuit exists between the electrode and the base metal and having a second digital value when an arc exists between the electrode and the base metal;

third means for generating a pulse control signal;

fourth means for generating a dip control signal; and fifth means, responsive to the arc-short decision signal, for conveying the pulse control signal to the control signal input port of the first means unless a short has existed between the electrode and the base metal for more than a predetermined period of time, and for temporarily conveying the dip control signal to the control signal input port of the first means if a short has existed between the electrode and the base metal for more than the predetermined period of time.

7. The pulse arc welding machine of claim 6, wherein the fifth means comprises three timers.

8. The pulse arc welding machine of claim 6, wherein the fifth means comprises an analog switch connected between the control signal input port of the first means and the third and fourth means.

* * * * *